US012630481B2

(12) United States Patent
Lee et al.

(10) Patent No.: US 12,630,481 B2
(45) Date of Patent: May 19, 2026

(54) MATERIAL SURFACE TREATMENT EQUIPMENT, MATERIAL SURFACE TREATMENT METHOD AND SILICON CARBIDE MATERIAL SURFACE TREATMENT METHOD

(71) Applicant: NATIONAL CENTRAL UNIVERSITY, Taoyuan City (TW)

(72) Inventors: Tien-Hsi Lee, Taoyuan City (TW);
Jun-Huang Wu, Taoyuan City (TW);
Yu-Sheng Chiou, Taoyuan City (TW);
Shu-Cheng Li, Taoyuan City (TW);
Wei-Chi Huang, Taoyuan City (TW);
Hsin Chen, Taoyuan City (TW)

(73) Assignee: National Central University, Taoyuan City (TW)

( * ) Notice: Subject to any disclaimer, the term of this patent is extended or adjusted under 35 U.S.C. 154(b) by 700 days.

(21) Appl. No.: 18/066,291

(22) Filed: Dec. 15, 2022

(65) Prior Publication Data

US 2024/0158309 A1    May 16, 2024

(30) Foreign Application Priority Data

Nov. 15, 2022    (TW) .................................. 111143638

(51) Int. Cl.
*C04B 41/00*        (2006.01)
*C04B 35/565*       (2006.01)
*C04B 41/53*        (2006.01)

(52) U.S. Cl.
CPC ........ *C04B 41/0045* (2013.01); *C04B 35/565* (2013.01); *C04B 41/009* (2013.01);
(Continued)

(58) Field of Classification Search
CPC . C04B 41/0045; C04B 35/565; C04B 41/009; C04B 41/5338; C04B 2235/3826;
(Continued)

(56) References Cited

U.S. PATENT DOCUMENTS

| | | | | |
|---|---|---|---|---|
| 2007/0197138 A1* | 8/2007 | Montierth | ........... | H10P 72/0412 451/36 |
| 2010/0000569 A1* | 1/2010 | Harrison | ................ | G01N 21/94 356/239.2 |
| 2022/0384278 A1* | 12/2022 | Wong | .................... | B24B 37/005 |

FOREIGN PATENT DOCUMENTS

| | | |
|---|---|---|
| JP | 7-94491 A | 4/1995 |
| JP | 2001-127032 A | 5/2001 |

(Continued)

OTHER PUBLICATIONS

Machine translation of JP 2001-127032 (Year: 2001).*

*Primary Examiner* — Xiuyu Tai

(74) *Attorney, Agent, or Firm* — Winston Hsu

(57) ABSTRACT

The invention provides a material surface treatment equipment, which is applied to a material substrate. The material surface treatment equipment includes a surface treatment device and at least one waveguide device. The surface treatment device is used to carry the material substrate to perform a surface treatment process. Each waveguide device is used for introducing electromagnetic waves to the material substrate to assist in performing the surface treatment process. Through the introduction of electromagnetic waves, the surface treatment process of the material substrate is easy to perform and can achieve the strengthening effect.

16 Claims, 6 Drawing Sheets

(52) U.S. Cl.
CPC .. *C04B 41/5338* (2013.01); *C04B 2235/3826*
(2013.01); *C04B 2235/963* (2013.01)

(58) Field of Classification Search
CPC . C04B 2235/963; B24B 37/005; B24B 37/24;
B24B 37/22; B24B 37/26; B24D 11/04;
B24D 3/28; B24D 11/001; B24D
2203/00; C09D 4/00; B33Y 70/00; B33Y
10/00; B33Y 80/00; B33Y 70/10; B29C
35/0805; B29C 64/112; B29C 2035/0827;
B29K 2995/0092; B29K 2033/04; B29K
2995/0077; H10P 74/23; H10P 52/403;
H10P 70/20; H10P 72/0412; H10P
72/0604; H10P 72/0606; H10P 72/0616;
H10P 74/203
See application file for complete search history.

(56) References Cited

FOREIGN PATENT DOCUMENTS

| JP | 2009-117782 A | 5/2009 |
| JP | 2011-200944 A | 10/2011 |
| WO | 2007/007683 A1 | 1/2007 |
| WO | 2007/063873 A1 | 6/2007 |

* cited by examiner

MATERIAL SURFACE TREATMENT EQUIPMENT, MATERIAL SURFACE TREATMENT METHOD AND SILICON CARBIDE MATERIAL SURFACE TREATMENT METHOD

FIELD OF THE INVENTION

The present invention relates to techniques of surface treatment for materials, specifically to a surface treatment equipment and a surface treatment method that apply electromagnetic waves introductions. The present invention also includes a surface treatment method for Silicon Carbide material.

BACKGROUND OF THE INVENTION

Material substrates are the major component of electronic parts or products. Normally, in the manufacturing procedure of such electronic parts or products, the material substrates need to undergo surface treatment such as polishing, etching or thinning for the operation or application in the manufacturing process afterwards.

Take the Silicon Carbide substrate for example. Silicon Carbide substrate is commonly utilized in the semiconductor industry. Since the hardness of Silicon Carbide substrate is only less than the diamond, it is especially difficult to perform the surface polishing on the Silicon Carbide substrate. Therefore, to achieve the ideal efficacy of polishing, the abrasive for polishing this would need to be a Nano-grade diamond granules. However, such diamond granules is more difficult and costly to produce, and such abrasive would also contain chemical substances with strong alkali or strong oxides, causing an active state on the surface of the Silicon Carbide substrate and inducing the chemical reactions in the polishing process. With the chemical substances utilized in the process, the liquid wastes therefrom would be strongly acidic or strongly alkaline, making it not environmental friendly and leading to potential damages to the environment if dealt improperly.

Therefore, it is an issue to be resolved in providing a surface treatment equipment to improve the aforementioned problems.

SUMMARY OF THE INVENTION

An objective of the present invention is to provide a material surface treatment equipment to introduce an electromagnetic wave to a substrate in the surface treatment process, so as to increase the efficacy thereof.

To achieve the objective mentioned above, the surface treatment equipment is applied to a substrate and includes a surface treatment device and at least one waveguide device. The surface treatment device carries the substrate to perform the surface treatment process, and each of the waveguide devices introduces electromagnetic waves to the substrate to assist in the surface treatment process.

In an embodiment, the electromagnetic wave is microwave with a frequency ranging between 900 MHz-2.45 GHz.

In an embodiment, the electromagnetic wave is ultraviolet light with a frequency ranging between $8 \times 10^{14}$ Hz-$2.4 \times 10^{16}$ Hz.

In an embodiment, the surface treatment device further includes a treatment agent supply unit to apply treatment agents that absorb electromagnetic waves to the substrate.

In an embodiment, the treatment agent includes oxide, hydroxide or halide of alkali metals or alkaline earth metals.

In an embodiment, the treatment agent includes oxide or halide of transition metals.

In an embodiment, the treatment agent is in liquid or solid form.

In an embodiment, the material surface treatment equipment further includes a gas supply device for introducing at least one inert gas or one active gas in the surface treatment process.

In an embodiment, the substrate is a Silicon substrate, Germanium substrate, Silicon Carbide substrate, Silicon Nitride substrate, Gallium Nitride substrate, Aluminum Nitride substrate, Silicon Oxide substrate, Zirconium Oxide substrate or Aluminum Oxide substrate.

In an embodiment, the substrate is one with a thin surface film.

In an embodiment, the thin surface film is a Silicon Oxide film, Silicon Carbide film, Silicon Nitride film, Gallium Nitride film, Aluminum Nitride film, Zirconium Oxide film or Aluminum Oxide film.

In an embodiment, the substrate is made of Group IV elemental semiconductors, Group IV compound semiconductors, Group III-V compound semiconductors, Group II-VI compound semiconductors or oxides or nitrides of metals or semimetals.

In an embodiment, the surface treatment process is an etching process, a thinning process or a polishing process.

Another objective of the present invention is to provide a material surface treatment method. The method includes the following steps: providing a surface treatment device for carrying the substrate; performing a surface treatment process to the substrate; and introducing an electromagnetic wave to the substrate to assist in performing the surface treatment process.

Yet another objective of the present invention is to provide a surface treatment method for Silicon Carbide materials. The method includes the following steps: providing a surface treatment device for carrying a Silicon Carbide substrate; performing a surface treatment process to the Silicon Carbide substrate; and introducing an ultraviolet light or a microwave to the Silicon Carbide substrate to assist in performing the surface treatment process.

Thereby the present invention has the waveguide device introduce the ultraviolet light, microwaves or electromagnetic waves in the material surface treatment process, inducing chemical reactions on the surface of the materials by the enhancement of microwaves or electromagnetic waves such as ultraviolet light, so as to enhance the efficacy of the surface treatment process. Additionally, the present invention reduces the use of chemical treatment agents, making it more environmentally friendly and effectively reducing the cost in the process.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

The description of unit, element and component in the present invention uses "one", "a", or "an". The way mentioned above is for convenience, and for general meaning of the category of the present invention. Therefore, the description should be understood as "include one", "at least one", and include the singular and plural forms at the same time unless obvious meaning.

The description of comprise, have, include, contain, or another similar semantics has the non-exclusive meaning. For example, an element, structure, product, or device contain multi requirements are not limited in the list of the content, but include another inherent requirement of element, structure, product or device not explicitly listed in the content. In addition, the term "or" has an inclusive meaning instead of an exclusive one.

Figure 1:
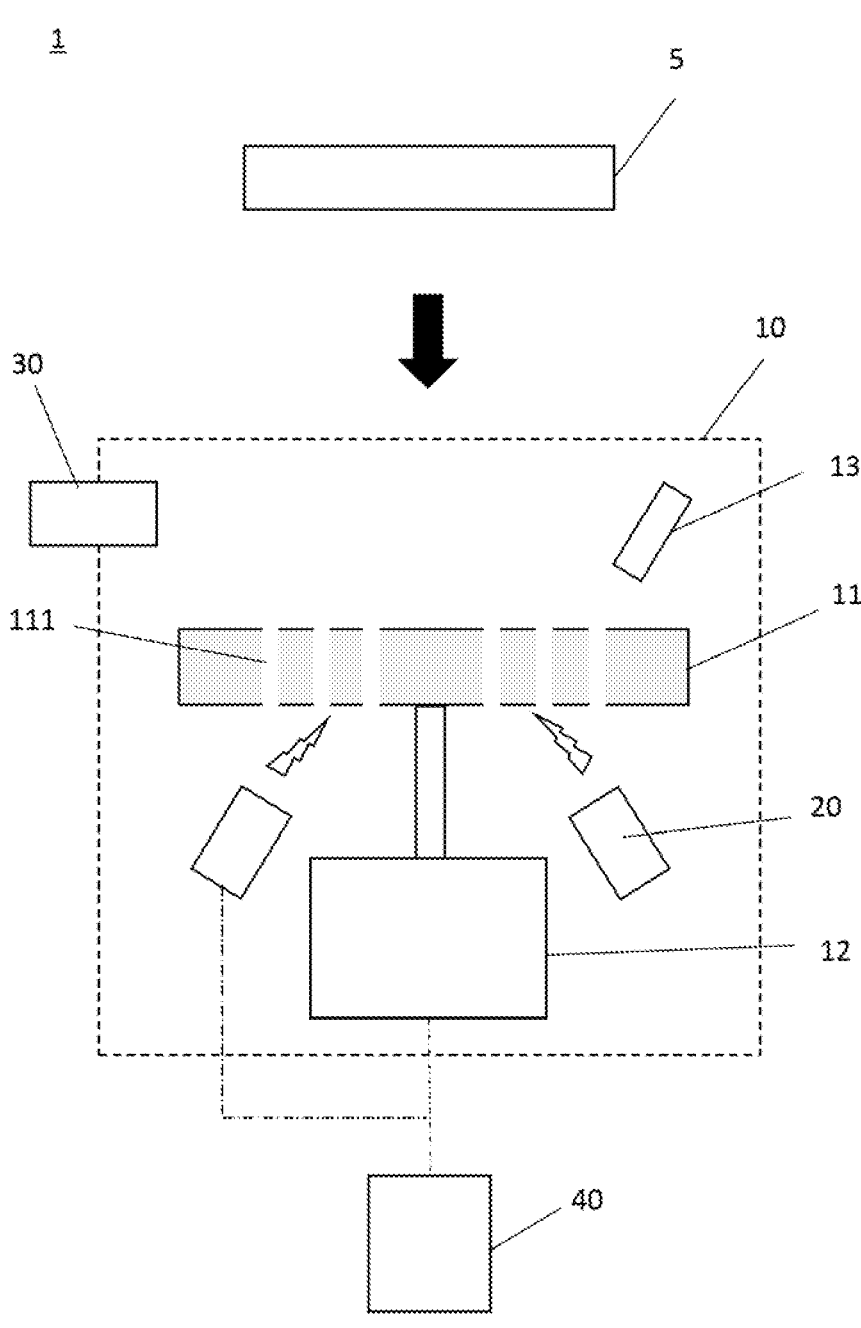
FIG. 1 is a schematic diagram of a material surface treatment equipment in a first embodiment according to the present invention.

Referring to FIG. 1, a schematic diagram of a material surface treatment equipment in a first embodiment according to the present invention, the material surface treatment equipment 1 is mainly applied to a substrate 5 for surface treatment. The substrate 5 is an electronic product or a basic element of a product. The substrate 5 can be a single layer structure made of single material or a multiple layers structure made of different materials; the structure and/or the materials can be changed as needed.

In an embodiment, the substrate 5 has a single layer structure as stated above for exemplary purpose. The substrate 5 can be a Silicon substrate, Germanium substrate, Silicon Carbide substrate, Silicon Nitride substrate, Gallium Nitride substrate, Aluminum Nitride substrate, Silicon Oxide substrate, Zirconium Oxide substrate or Aluminum Oxide substrate. But the present invention is not limited to such application.

In an embodiment, the substrate 5 has a multiple layers structure as stated above for exemplary purpose; it can be one with a thin surface film. That is, the substrate 5 has the single layer as a basic layer and then a thin surface film formed on the basic layer. The thin surface film can be a Silicon Oxide film, Silicon Carbide film, Silicon Nitride film, Gallium Nitride film, Aluminum Nitride film, Zirconium Oxide film or Aluminum Oxide film, but the present invention is not limited to such application.

Moreover, in an embodiment, the substrate 5 can be made of semiconductor materials. For instance, the substrate 5 can be made of Group IV elemental semiconductors, Group IV compound semiconductors, Group III-V compound semiconductors, Group II-VI compound semiconductors or oxides or nitrides of metals or semimetals, but the present invention is not limited to such application.

The material surface treatment equipment 1 mainly includes a surface treatment device 10 and at least one waveguide device 20. The surface treatment device 10 carries the substrate 5 to perform a surface treatment process. In an embodiment, the surface treatment process is an etching process, a thinning process, a polishing process, a chemical-mechanical polishing process or other surface treatment process. Herein the surface treatment device 10 includes a processing unit 11 and a driving unit 12; the latter is connected to the former. The processing unit 11 directly contacts the substrate 5 for surface treatment, while the driving unit 12 drives the processing unit 11 to operate in accordance with the substrate 5. Take polishing as the surface treatment process for example. The processing unit 11 is a polishing disc and the driving unit 12 is a servomotor. Therefore, the polishing disc is driven by the servomotor to rotate around the substrate 5 accordingly for performing the surface treatment process of polishing. The structure and/or operation of the processing unit 11 and the driving unit 12 can be adjusted according to the surface treatment process required.

The processing unit 11 includes a plurality of openings 111, each of which linking a side of the processing unit 11 through the corresponding side thereof.

The at least one waveguide device 20 introduces an electromagnetic wave (including ultraviolet light and microwaves) to the substrate 5 to assist in the surface treatment process. Furthermore, the waveguide device 20 would introduce the electromagnetic wave to where the substrate 5 is, specifically on the surface of the substrate 5 to be treated, to assist in the surface treatment process. The number and/or position of the waveguide device 20 is flexible in accordance with the purpose of design. In an embodiment, the electromagnetic wave is microwave with a frequency ranging between 900 MHz-2.45 GHz; in another embodiment, the electromagnetic wave is ultraviolet light with a frequency ranging between $8\times10^{14}$ Hz-$2.4\times10^{16}$ Hz. However, the electromagnetic waves and the frequency thereof can be altered according to different substrates 5. For instance, the electromagnetic wave can be a radio wave, high frequency wave or an electromagnetic wave with other frequencies.

The material surface treatment equipment 1 further includes a control system 30 that is electrically connected to the surface treatment device 10 and the at least one waveguide device 20. The control system 30 individually controls the surface treatment device 10 and the at least one waveguide device 20 for performing the surface treatment processing. In an embodiment, the control system 30 is a computer system or a remote control device.

To operate the material surface treatment equipment 1, the substrate 5 is firstly placed in the surface treatment device 10 to be fixedly carried by the processing unit 11. Then a treatment agent is applied to where the substrate 5 is, and the at least one waveguide device 20 introduces the electromagnetic wave to the substrate 5; the electromagnetic wave would go through the plurality of openings 111 of the processing unit 11 and reach the surface to be treated on the substrate 5, inducing a chemical reaction on the surface of the substrate 5 or activating the treatment agent, so as to achieve the purpose of enhancing the surface treatment process. Lastly, the driving unit 12 drives the processing unit 11 to operate around the substrate 5 accordingly for the processing unit 11 to perform the surface treatment on the surface to be treated of the substrate 5.

For instance, the substrate 5 is a Silicon Carbide substrate and the surface treatment process is a polishing process. When the surface to be treated on the Silicon Carbide substrate receives the microwave with 2.45 GHz, 900 W, the electrons within the surface of the Silicon Carbide substrate would be activated by the microwave, especially the unpaired electrons in the dangling bonds. The unpaired electrons would then turn into the state of hot electrons due to the free carrier absorption effect and be able to break the energy barrier and enter the Si—C bonds formation on the surface. Therefore, when the carbon atoms absorb the microwave and a drastic oscillation thereof occurs, the hot electrons are in a even more unstable state after entering the formation of the bonds, causing the breakage of Si—C bonds and the carbon and silicon pairing with oxygen individually; $CO_2$ is thereby produced and a $SiO_2$ or $Si(OH)_4$ layer is formed after the oxidization reaction occurs on the surface of the substrate, softening the surface of the substrate (i.e., reducing the hardness on the surface) and thus achieving the purpose of surface modification. Consequently, the Silicon Carbide substrate received the microwave would have the surface thereof oxidized and become polished.

Also, before the Silicon Carbide substrate is polished, the surface thereof is basically rough and the roughness is mostly presented by protrusions. Based on the principle of chemical polishing from microwaves, the protrusions tend to have the activated hot electrons described above gathering thereon due to the gathering effect of electric charges; therefore, it is easier for the activated hot electrons to occur the reduction-oxidation reaction with the treatment agent, making it quicker to have the atoms on the protrusions react with the treatment agent than to have the atom on a relatively flatter area react with the treatment agent. Consequently, the surface is smooth after the process.

Figure 2A:
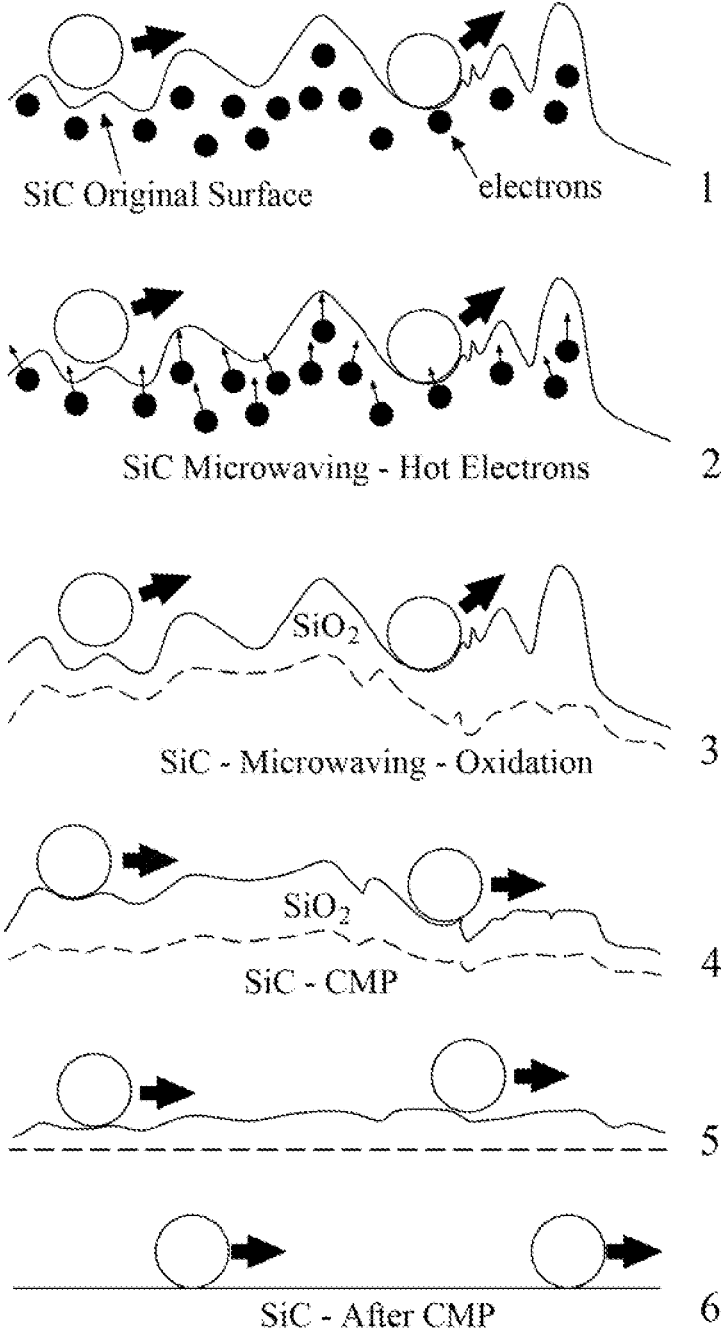
FIG. 2A is a schematic diagram illustrating the material surface softened and planarized after a microwave treatment process.
Figure 2B:
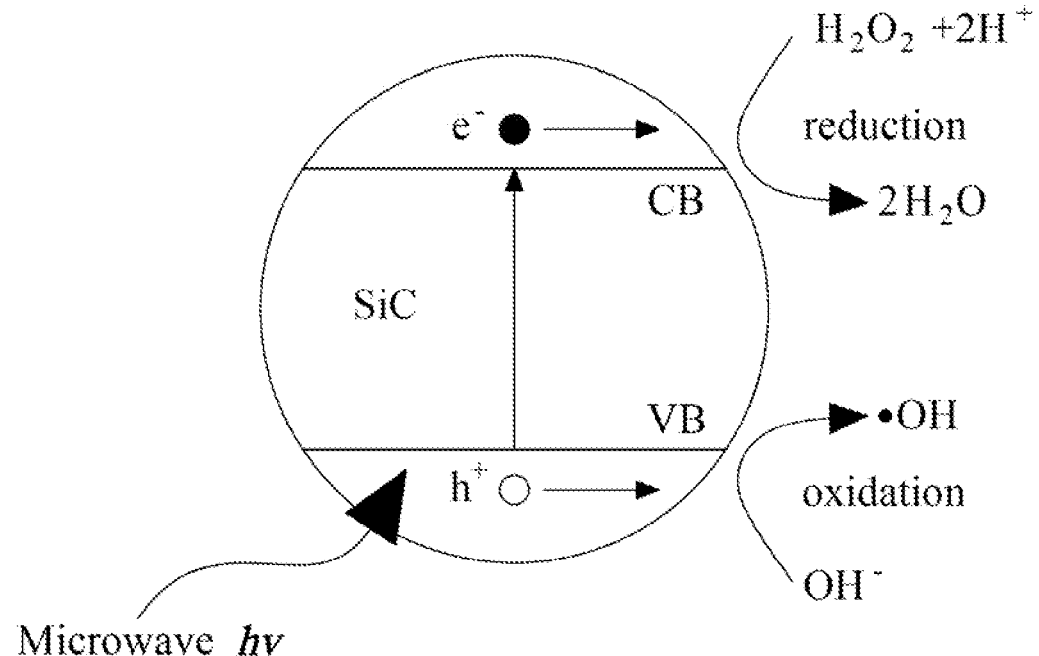
FIG. 2B is a schematic diagram illustrating a reduction-oxidation reaction induced by microwaves.

The following is the description of the present invention achieving the enhancement of the surface treatment process. With reference to FIGS. 2A and 2B, FIG. 2A is a schematic diagram illustrating the material surface softened and planarized after a microwave treatment process, and FIG. 2B is a schematic diagram illustrating a reduction-oxidation reaction induced by microwaves. As shown in FIG. 2A, a grinding process on Silicon Carbide material is taken as an example. After the material surface is treated by the microwave, it is oxidized and a $SiO_2$ layer (or a $Si(OH)_4$ layer) is formed. The more it protrudes on the material surface, the more it would be oxidized and then removed after a touch polishing process or chemical-mechanical polishing (CMP) grinding process, making the material surface planarized and even closer to a plane. Based on the Mohs scale, the hardness of the oxidized layer (about 6-7) is far lower than the hardness of the Silicon Carbide (about 9), so when removing the oxidized layer with less hard particles, the new Silicon Carbide surface would not be damaged. The broken lines in FIG. 2A represents the edge between the Silicon Carbide material and the oxidized layer. And after the firstly formed oxidized layer undergoes the CMP grinding process and is planarized, the oxidation and grinding process would be repeated to produce a smooth enough surface as the final result.

As shown in FIG. 2B, after the electrons are activated by the microwave, they would go to the conduction band to occur a reduction reaction with the treatment agent for grinding; the electron holes occurred therewith would undergo a surface oxidization reaction to break the Si—C bonds. Therefore, the treatment agent does not need to be strong alkaline or strong acidic to achieve the enhanced efficacy for the surface treatment of the Silicon Carbide material.

Back to FIG. 1, in an embodiment, the surface treatment device 10 further includes a treatment agent supply unit 13 to apply a treatment agent that absorbs electromagnetic waves to the substrate 5. The treatment agent supply unit 13 can be arranged around the processing unit 11 to apply treatment agent to where the substrate 5 is. The treatment agent is activated after absorbing the electromagnetic wave, enhancing the chemical reaction thereof on the surface of the substrate 5. Depending on different requirements, the treatment agent is in vapor, liquid, or solid form (like a powder or granular), or it can be a mixture of both liquid and solid substances. In an embodiment, the treatment agent includes oxide, hydroxide or halide of alkali metals or alkaline earth metals; it can also include oxide or halide of transition metals. But the present invention is not limited to such application.

On the other hand, the treatment agent can include a plurality of solid granules selected at least one from a group consisting of: Silicon dioxide, Aluminum oxide, Silicon carbide, Boron nitride, Boron carbide and diamond. With the electromagnetic waves introduced, a surface treatment process to the Silicon Carbide substrate can be performed, and the major component of the treatment agent can be one with a hardness less than the diamond to achieve the efficacy.

The material surface treatment equipment 1 further includes a gas supply device 40 for introducing at least one inert gas or one active gas in the surface treatment process. The inert gas or active gas is filled around the surface treatment device 10 or in the internal space of the surface treatment device 10 in order to have the surface treatment process performed under an environment filled with the inert gas or active gas. The inert gas is for slowing down chemical reactions to prevent the materials being damaged from over-reactions; the active gas is for assisting in the chemical reaction to encourage a stronger reaction between the treatment agent and the substrate 5.

Figure 3:
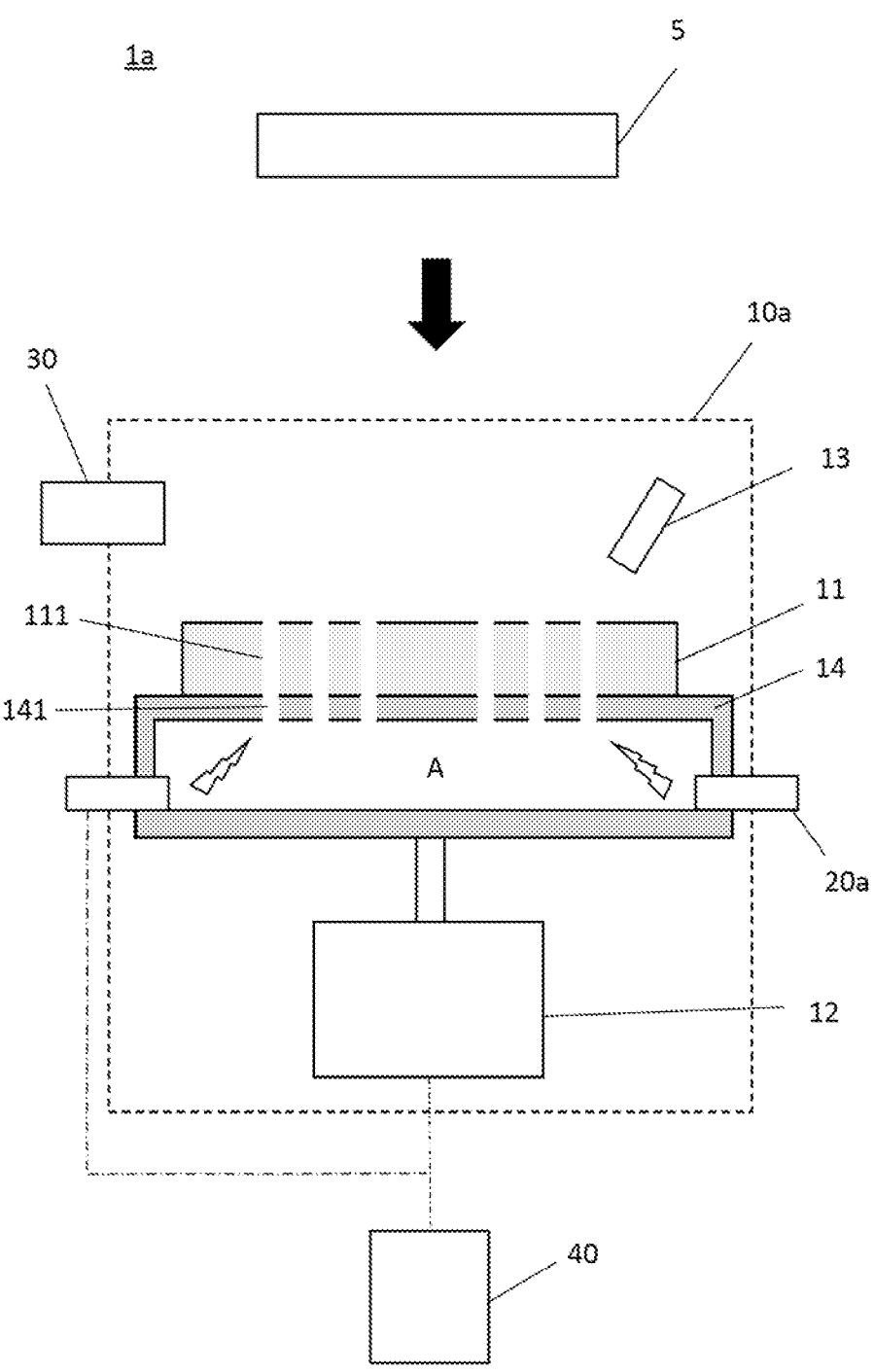
FIG. 3 is a schematic diagram of the material surface treatment equipment in a second embodiment according to the present invention.

Referring to FIG. 3, a schematic diagram of a material surface treatment equipment in a second embodiment according to the present invention, the surface treatment device 10a of the material surface treatment equipment 1a includes a processing unit 11, a driving unit 12 and a carrier platform 14. The processing unit 11 is fixedly disposed on the carrier platform 14 and the carrier platform 14 is connected to the driving unit 12. The driving unit 12 simultaneously drives the processing unit 11 and the carrier platform 14 for the latter to operate with the substrate 5 accordingly. The carrier platform 14 has a cavity space A formed therein and a plurality of through holes 141 at the side contacting the processing unit 11; each though hole 141 connects from outside of the carrier platform 14 to the cavity space A individually. The material surface treatment equipment 1a further includes at least one waveguide device 20a assembled to the carrier platform 14 to introduce electromagnetic waves into the cavity space A; the electromagnetic waves would go through the through holes 141 of the carrier platform 14 and the openings Ill of the processing unit 11 to treat the surface to be treated on the substrate 5, so as to achieve the purpose of enhancing the surface treatment process. With the arrangement of the cavity space A, the electromagnetic waves can be gathered for introduction to the surface of the substrate 5.

Figure 4:
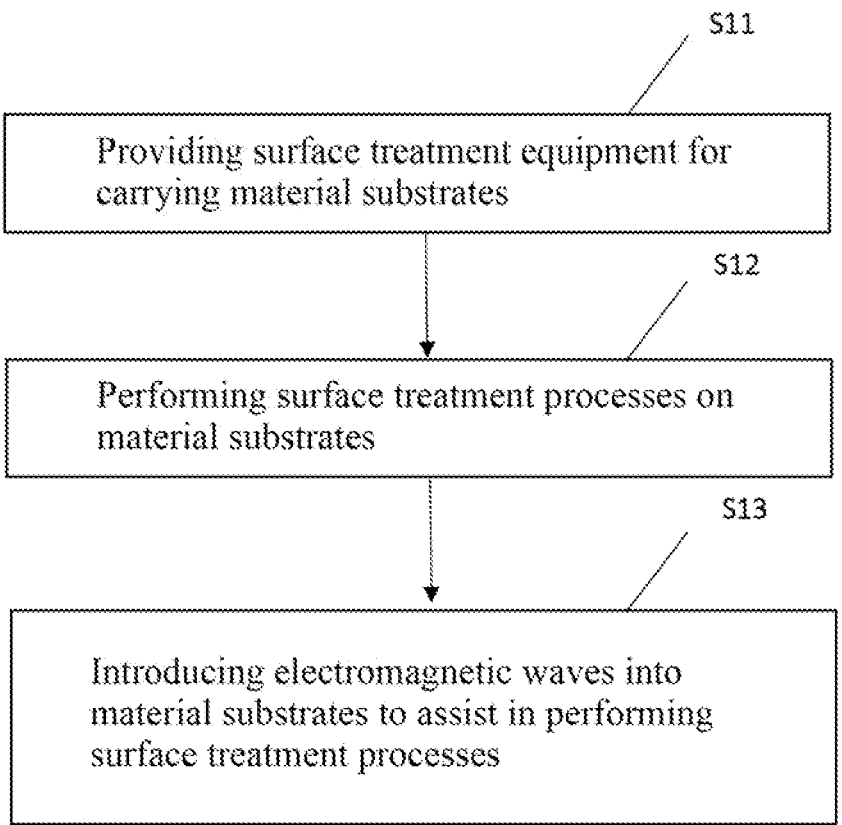
FIG. 4 is a flow diagram of a material surface treatment method according to the present invention.

FIG. 4 is a flow diagram of a material surface treatment method according to the present invention. As shown in FIG. 4, the present invention further includes a material surface treatment method. The method includes the following steps:

Step S11: providing a surface treatment device for carrying the substrate.

Firstly, providing the aforesaid material surface treatment equipment 1, the surface treatment device 10 and the substrate 5 to be treated; the substrate 5 can be disposed on the surface treatment device 10.

Step S12: performing a surface treatment process to the substrate.

After Step S11, a surface treatment process such as polishing, etching or thinning is performed to the substrate 5.

Step S13: introducing an electromagnetic wave to the substrate to assist in performing the surface treatment process.

After Step S12, an electromagnetic wave is introduced to the substrate 5 to enhance the chemical reaction on the surface thereof and/or activate the treatment agent for the surface treatment process.

Figure 5:
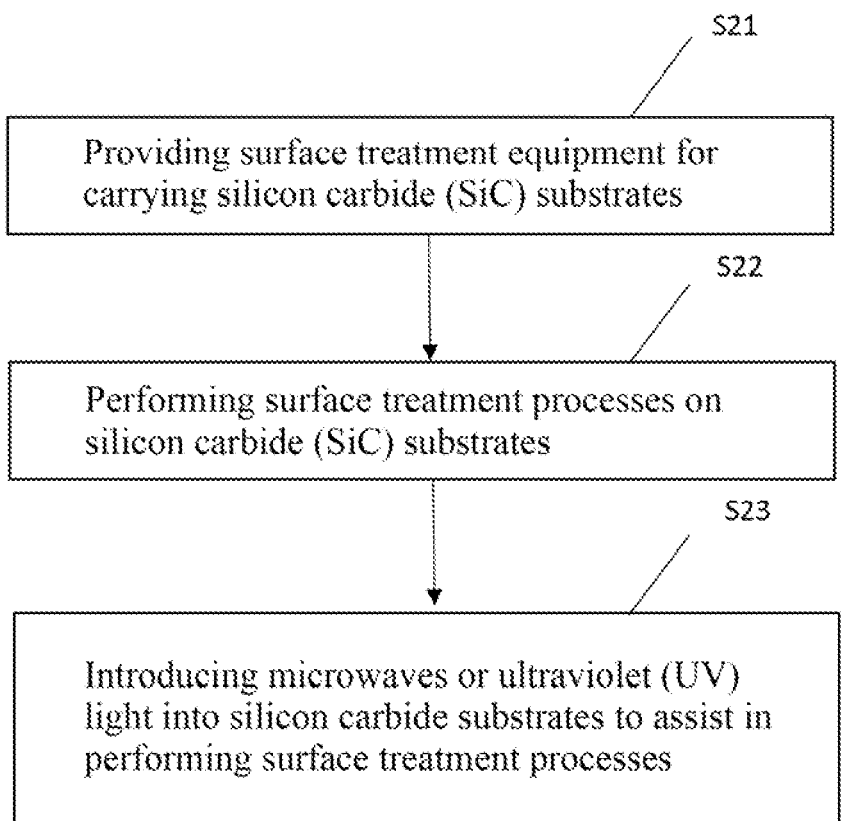
FIG. 5 is a flow diagram of a surface treatment method for Silicon Carbide materials according to the present invention.

FIG. 5 is a flow diagram of a surface treatment method for Silicon Carbide materials according to the present invention. As shown in FIG. 5, the present invention further includes a surface treatment method for Silicon Carbide material; the method includes the following steps:

Step S21: providing a surface treatment device for carrying a Silicon Carbide substrate.

Firstly, providing the aforesaid material surface treatment equipment 1, the surface treatment device 10 and the Silicon Carbide substrate to be treated; the Silicon Carbide substrate can be disposed on the surface treatment device 10.

Step S22: performing a surface treatment process to the Silicon Carbide substrate.

After Step S21, a surface treatment process such as polishing, etching or thinning is performed to the Silicon Carbide substrate.

Step S23: introducing a microwave or an ultraviolet light to the Silicon Carbide substrate to assist in performing the surface treatment process.

After Step S22, a microwave or an ultraviolet light is introduced to the Silicon Carbide substrate to enhance the chemical reaction on the surface thereof and/or activate the treatment agent for the surface treatment process.

The present invention is disclosed by the preferred embodiments in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A material surface treatment equipment applied to a substrate, said material surface treatment equipment comprising:
   a surface treatment device, comprises:
      a processing unit, comprises:
         a first side;
         a second side, opposite to the first side;
         a plurality of openings, each of which linking the first side to the second side,
            wherein the substrate is carried by the first side of the processing unit to perform a surface treatment process; and
      at least one waveguide device, each introducing an electromagnetic wave go through the plurality of openings from the second side to the first side and reach the substrate to assist in said surface treatment process.

2. The material surface treatment equipment defined in claim 1, wherein the electromagnetic wave is microwave with a frequency ranging between 900 MHz-2.45 GHz.

3. The material surface treatment equipment defined in claim 1, wherein the electromagnetic wave is ultraviolet light with a frequency ranging between $8 \times 10^{14}$ Hz-$2.4 \times 10^{16}$ Hz.

4. The material surface treatment equipment defined in claim 3, wherein the surface treatment device further includes a treatment agent supply unit to apply a treatment agent to said substrate, said treatment agent being able to absorb said ultraviolet light.

5. The material surface treatment equipment defined in claim 1, wherein the surface treatment device further includes a treatment agent supply unit to apply a treatment agent to said substrate, said treatment agent being able to absorb said electromagnetic wave.

6. The material surface treatment equipment defined in claim 5, wherein the treatment agent includes oxide, hydroxide or halide of alkali metals or alkaline earth metals.

7. The material surface treatment equipment defined in claim 5, wherein the treatment agent includes oxide or halide of transition metals.

8. The material surface treatment equipment defined in claim 5, wherein the treatment agent is in liquid or solid form.

9. The material surface treatment equipment defined in claim 1, further includes a gas supply device for introducing at least one inert gas or one active gas in the surface treatment process.

10. The material surface treatment equipment defined in claim 1, wherein the substrate is a Silicon substrate, Germanium substrate, Silicon Carbide substrate, Silicon Nitride substrate, Gallium Nitride substrate, Aluminum Nitride substrate, Silicon Oxide substrate, Zirconium Oxide substrate or Aluminum Oxide substrate.

11. The material surface treatment equipment defined in claim 1, wherein the substrate is one with a thin surface film.

12. The material surface treatment equipment defined in claim 11, wherein the thin surface film is a Silicon Oxide film, Silicon Carbide film, Silicon Nitride film, Gallium Nitride film, Aluminum Nitride film, Zirconium Oxide film or Aluminum Oxide film.

13. The material surface treatment equipment defined in claim 1, wherein the substrate is made of Group IV elemental semiconductors, Group IV compound semiconductors, Group III-V compound semiconductors, Group II-VI compound semiconductors or oxides or nitrides of metals or semimetals.

14. The material surface treatment equipment defined in claim 1, wherein the surface treatment process is an etching process, a thinning process or a polishing process.

15. A material surface treatment method using the material surface treatment equipment of claim 1 applied to the substrate, said material surface treatment method comprising:
   providing the processing unit of the surface treatment device for carrying said substrate;
   performing the surface treatment process to said substrate; and
   introducing the electromagnetic wave to said substrate to assist in performing said surface treatment process.

16. A surface treatment method for Silicon Carbide materials by using the material surface treatment equipment of claim 1, comprising:
   providing the processing unit of the surface treatment device for carrying a Silicon Carbide substrate;
   performing the surface treatment process to said Silicon Carbide substrate; and introducing a microwave or an ultraviolet light to said Silicon Carbide substrate to assist in performing said surface treatment process.

* * * * *